United States Patent
Saeki et al.

(10) Patent No.: US 12,050,524 B2
(45) Date of Patent: Jul. 30, 2024

(54) SENSING DEVICE, SENSING METHOD, AND SENSING PROGRAM

(71) Applicant: NIPPON TELEGRAPH AND TELEPHONE CORPORATION, Tokyo (JP)

(72) Inventors: Takuya Saeki, Musashino (JP); Iifan Tyou, Musashino (JP); Yukio Nagafuchi, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1010 days.

(21) Appl. No.: 16/975,410

(22) PCT Filed: Feb. 25, 2019

(86) PCT No.: PCT/JP2019/007095
§ 371 (c)(1),
(2) Date: Aug. 25, 2020

(87) PCT Pub. No.: WO2019/167891
PCT Pub. Date: Sep. 6, 2019

(65) Prior Publication Data
US 2020/0401497 A1 Dec. 24, 2020

(30) Foreign Application Priority Data

Mar. 1, 2018 (JP) ................................. 2018-036984

(51) Int. Cl.
*G06N 20/00* (2019.01)
*G06F 11/34* (2006.01)
(Continued)

(52) U.S. Cl.
CPC .......... *G06F 11/3452* (2013.01); *H04L 12/66* (2013.01); *H04L 41/16* (2013.01); *G06N 20/00* (2019.01)

(58) Field of Classification Search
None
See application file for complete search history.

(56) References Cited

FOREIGN PATENT DOCUMENTS

JP 2010-152431 A 7/2010

OTHER PUBLICATIONS

Beukema, Enhancing Network Intrusion Detection through Host Clustering, Master's thesis, University of Twente, 2016, pp. 1-96 (Year: 2016).*

(Continued)

*Primary Examiner* — Wilbert L Starks
(74) *Attorney, Agent, or Firm* — XSENSUS LLP

(57) ABSTRACT

A detecting device includes a memory, and processing circuitry coupled to the memory and configured to collect communication information from a communication device, have a model learn a characteristic of the communication information by the communication device using the communication information collected for each of the communication devices, and input communication information on a detection target to the model, detect whether the communication information on the detection target indicates abnormal communication on the basis of an output result from the model, and have the model relearn at the learning when the number of detected abnormalities about the communication information during a predetermined evaluation period exceeds a first threshold value.

6 Claims, 10 Drawing Sheets

(51) Int. Cl.
  *H04L 12/66* (2006.01)
  *H04L 41/16* (2022.01)

(56) References Cited

OTHER PUBLICATIONS

Sánchez, Global Behavior Modeling: A New Approach to Grid Autonomic Management, Doctoral Thesis, Universidad Politécnica de Madrid, 2010, pp. 1-204 (Year: 2010).*
Akkaya, Data-Driven Cyber-Physical Systems via Real-Time Stream Analytics and Machine Learning, Doctoral Thesis, University of California, Berkeley, 2016, pp. 1-136 (Year: 2016).*
International Search Report and Written Opinion mailed on Apr. 23, 2019 for PCT/JP2019/007095 filed on Feb. 25, 2019, 6 pages including English Translation of the International Search Report.
Ide, T., "Introduction to Anomaly Detection Using Machine Learning," Corona Publishing Co., Ltd., Feb. 19, 2015, pp. 124-139.
Kondoh, T., et al. "A Study of Requirements on Authentication and Traffic Control for IoT Devices," The Institute of Electronics, Information and Communication Engineers, IEICE Technical Report, vol. 116, No. 251, Oct. 2016, 10 pages (with English Translation).

\* cited by examiner

SENSING DEVICE, SENSING METHOD, AND SENSING PROGRAM

CROSS-REFERENCE TO RELATED APPLICATIONS

The present application is based on PCT filing PCT/JP2019/007095, filed Feb. 25, 2019, which claims priority to JP 2018-036984, filed Mar. 1, 2018, the entire contents of each are incorporated herein by reference.

TECHNICAL FIELD

The present invention relates to a detecting device, a detecting method, and a detecting program.

BACKGROUND ART

With the advent of the IoT (Internet of Things) age, data obtained through IoT devices has become available over networks in various manners. Therefore, a system has been proposed in which normal communication is learned on the basis of communication information including a destination IP address and a port number, communication is permitted for normal communication, and the communication is interrupted at the occurrence of abnormal communication.

CITATION LIST

Non Patent Literature

[NPL 1] Tsuyoshi Ide, "Introduction to Anomaly Detection Using Machine Learning," CORONA PUBLISHING CO., LTD., Feb. 19, 2015
[NPL 2] Tsuyoshi Kondo; Shingo Kashima; Masami Ueno, "A Study of Requirements on Authentication and Traffic Control for IoT Devices," IEICE Technical Report, October 2016, vol. 116, no. 251, pp. 15-18

SUMMARY OF THE INVENTION

Technical Problem

In the conventional system, when normal communication is learned and a model is produced on the basis of communication information on a device while the amount of communication information to be learned is small, the communication patterns by the device cannot be fully covered in some cases. As a result, it is highly likely that the conventional system erroneously determines normal communication as abnormal communication, and the error in determination may impose an increased operation load on the system operator.

Also in the conventional system, when communication is controlled using a model produced for detecting an abnormality about communication information and unknown communication which has not been encountered in the process of learning occurs, the communication is detected as abnormal communication. However, the conventional system cannot determine whether to perform relearning to cope with the insufficient learning state of the communication model or continue the operation without relearning.

With the foregoing in view, it is an object of the present invention to provide a detecting device, a detecting method, and a detecting program which can provide a model for detecting an abnormality about communication information with improved accuracy and allows the operation load on a system operator to be reduced.

Means for Solving the Problem

In order to solve the problem and achieve the object, a detecting device according to the present invention includes: a memory; and processing circuitry coupled to the memory and configured to: collect communication information from a communication device, have a model learn a characteristic of the communication information by the communication device using the communication information collected for each of the communication devices, and input communication information on a detection target to the model, detect whether the communication information on the detection target indicates abnormal communication on the basis of an output result from the model, and have the model relearn at the learning when the number of detected abnormalities about the communication information during a predetermined evaluation period exceeds a first threshold value.

Effects of the Invention

According to the present invention, the accuracy of a model for detecting an abnormality about communication information can be improved, and the operation load on the system operator can be reduced.

DESCRIPTION OF EMBODIMENTS

Figure 1:
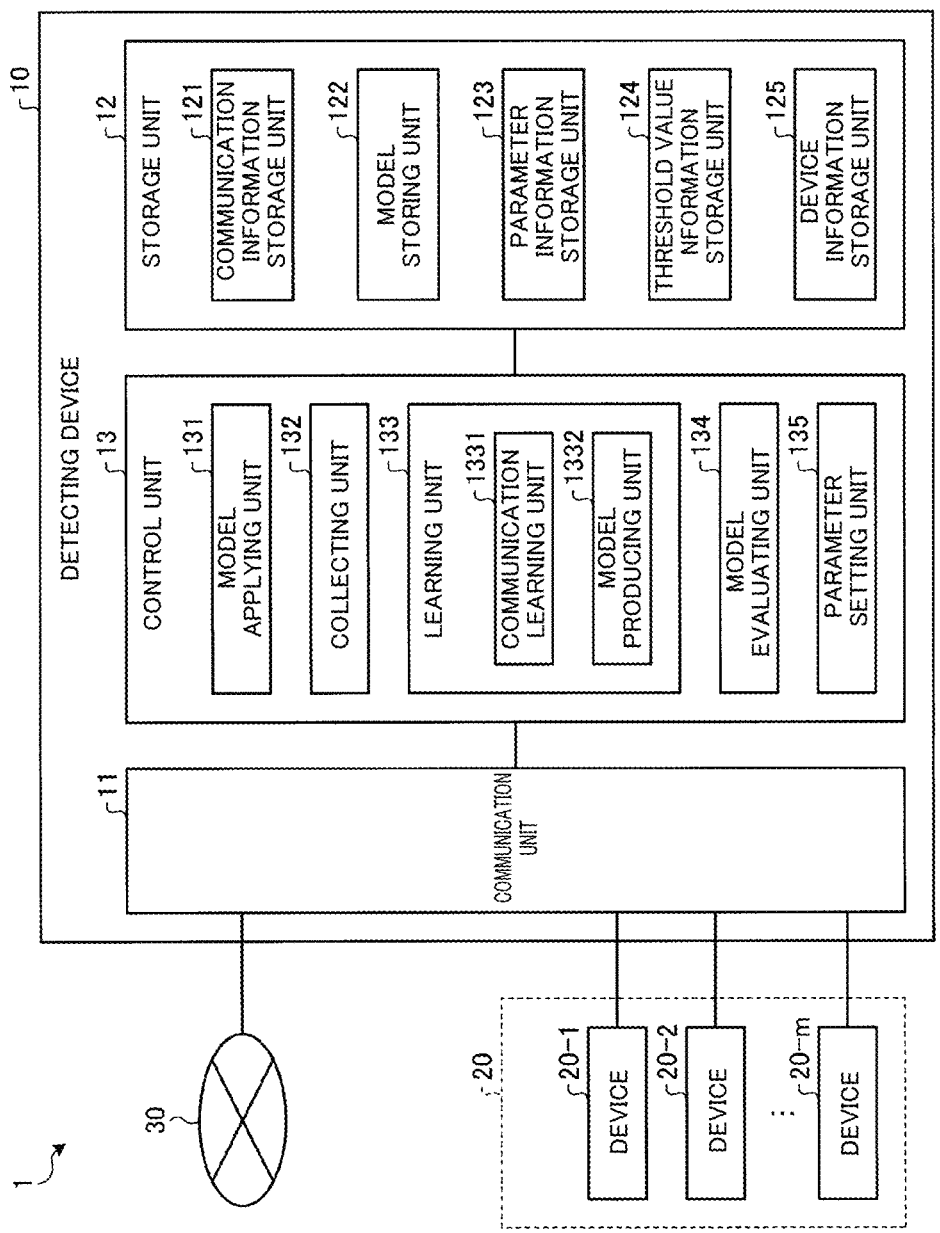
FIG. 1 is a view of an exemplary detecting system according to an embodiment of the invention.

Hereinafter, an embodiment of the present invention will be described in detail in conjunction with the drawings. Note that the embodiment is not intended to limit the present invention. In the drawings, the same portions are designated by the same reference characters.

Embodiment

An embodiment of the present invention will be described. FIG. 1 is a view of an exemplary detecting system according to the embodiment.

As shown in FIG. 1, the detecting system 1 according to the embodiment includes multiple devices 20-1 to 20-*m* and a detecting device 10 which detects whether there is an abnormality about communication information exchanged with the devices 20-1 to 20-*m*. The detecting device 10 is connected with an external device (not shown) for example over a network 30.

The devices 20-1 to 20-*m* are IoT devices. The devices 20-1 to 20-*m* transmit communication information including for example time information and positional information and corresponding prescribed information associated therewith to the detecting device 10 for example by wireless communication. Multiple devices are each generically and non-individually referred to as a device 20. The number of devices 20 is not limited to the number shown in FIG. 1.

The detecting device 10 receives communication information transmitted by a device 20 and detects whether the received communication information indicates abnormal communication. The detecting device 10 permits communication for normal communication and interrupts the communication at the occurrence of abnormal communication. The detecting device 10 detects whether there is an abnormality about communication information using a model which has learned normal communication on the basis of communication information such as a destination IP address and a port number. In this example, the detecting device 10 produces a model for each of the devices 20. Then, the detecting device 10 evaluates the model after learning and has the model relearn according to the evaluation result, so that the model for detecting an abnormality about communication information can have improved accuracy. The detecting device 10 itself determines whether to perform relearning according to the operation state and thus reduces the operation load on the system operator.

[Structure of Detecting Device]

Now, the structure of the detecting device will be described with reference to FIG. 1. As shown in FIG. 1, the detecting device 10 includes a communication unit 11, a storage unit 12, and a control unit 13. Although the detecting device 10 is a physical server in the example in the following description, the detecting device 10 may be a virtual server deployed on a physical server.

The communication unit 11 is a communication interface which transmits/receives various kinds of information to/from the device 20 and another device connected for example over the network 30. The communication unit 11 is implemented for example as a Network Interface Card (NIC) and communicates between another device and the control unit 13 (which will be described) through a telecommunication network such as a LAN (Local Area Network) and the Internet.

The storage unit 12 is a storage device such as an HDD (Hard Disk Drive), an SSD (Solid-State Drive), and an optical disk. The storage unit 12 may be a data-rewritable semiconductor memory such as a RAM (Random Access Memory), a flash memory, and an NVSRAM (Non-Volatile Static Random Access Memory). The storage unit 12 stores an OS (Operating System) or various programs executed by the detecting device 10. The storage unit 12 also stores various kinds of information used in executing the programs. The storage unit 12 includes a communication information storage unit 121, a model storage unit 122, a parameter information storage unit 123, a threshold value information storage unit 124, and a device information storage unit 125.

The communication information storage unit 121 stores communication information collected from each of the devices 20 through the communication unit 11. When communication information on a detection target is input, the model storage unit 122 stores a model for outputting information indicating whether the input communication information indicates abnormal communication and stores various parameters of the model which has learned characteristics of normal communication information by the device 20.

The parameter information storage unit 123 stores information including parameters set at the time of model relearning. These parameters are set by a parameter setting unit 135 (which will be described).

The threshold value information storage unit 124 stores information including first and second threshold values used in determining whether to perform relearning during model evaluation. The first threshold value is used to evaluate relearning during model operation. The second threshold value is set for each model by a learning unit 133 (which will be described) at the time of model learning.

The device information storage unit 125 stores identification information on devices 20 other than a learning target. The devices 20 other than the learning target are registered by the model evaluating unit 134 (which will be described).

The control unit 13 controls the entire detecting device 10. The control unit 13 is for example an electronic circuit such as a CPU (Central Processing Unit) and an MPU (Micro Processing Unit) or an integrated circuit such as an ASIC (Application Specific Integrated Circuit) and an FPGA (Field Programmable Gate Array). The control unit 13 has an internal memory for storing programs which specify various procedures or control data and performs various kinds of processing using the internal memory. The control unit 13 also functions as various processing units as various programs operate. The control unit 13 includes a model applying unit 131 (detecting unit), a collecting unit 132, the learning unit 133, the model evaluating unit 134 (evaluating unit), and the parameter setting unit 135 (setting unit).

The model applying unit 131 applies a model set for each of the devices 20, inputs communication information by a device 20 as a detection target to a model corresponding to the device 20, and detects whether the communication information on the detection target indicates abnormal communication on the basis of an output result from the model. The model applying unit 131 interrupts communication when the communication is abnormal communication and permits communication when the communication is normal communication.

When the number of detected abnormalities about communication information exceeds the first threshold value during a prescribed evaluation period in operation, the model applying unit 131 has the learning unit 133 execute the relearning by the model. Here, the first threshold value used by the model applying unit 131 may be the second threshold value set by the learning unit 133 or may be a previously set threshold value according to operation rules. The model applying unit 131 obtains communication information by the device 20 through the communication unit 11. The model applying unit 131 outputs the obtained communication information to the collecting unit 132 for example by packet mirroring.

The collecting unit 132 obtains communication information from devices 20 connected under the system. The collecting unit 132 stores the obtained communication information in the communication information storage unit 121.

The learning unit 133 uses the communication information collected for each of the devices 20 to have the model learn characteristics of the communication information by the device 20. The learning unit 133 includes a communication learning unit 1331 and a model producing unit 1332.

The communication learning unit 1331 uses communication information about normal communication collected for each of the devices 20 to have the model learn the characteristics of communication information by the device 20. The communication learning unit 1331 applies machine learning to have the model learn.

The model producing unit 1332 produces, for each of the devices 20, a model used for detecting whether the communication information on a detection target indicates abnormal communication. The model producing unit 1332 optimizes the parameters of the models as learning of the communication information about normal communication is executed.

Here, the model producing unit 1332 provides a likelihood according to the number of learned communication patterns and the number of communication occurrences. Then, the model producing unit 1332 calculates and sets a second threshold value for the allowable detected abnormalities on the basis of the likelihood provided in producing a model to be used for determining abnormal communication. In other words, the model producing unit 1332 calculates the likelihood according to the number of communication patterns and the number of communication occurrences during the learning by the model and sets the second threshold value according to the calculated likelihood.

At the time, the model producing unit 1332 sets the second threshold value to a lower value than a prescribed value according to a prescribed rule when the calculated likelihood is lower than a prescribed value. In this way, a lower threshold value is set for a lower likelihood and relearning can be more easily performed. Alternatively, the model producing unit 1332 may set a threshold value by feeding back the learning state up to the point.

The model evaluating unit 134 evaluates the model after learning by the learning unit 133 on the basis of the number of detected abnormalities and the number of learning times about communication information. The model evaluating unit 134 evaluates whether the number of learning times is less than a prescribed number. The model evaluating unit 134 also evaluates whether the number of detected abnormalities exceeds the second threshold value. As for a model determined to have a number of detected abnormalities less than the second threshold value, the model evaluating unit 134 evaluates that the model can be registered/updated and stores the model. Here, the second threshold value used by the model evaluating unit 134 is a threshold value set by the model producing unit 1332 on the basis of the likelihood.

As for a model having a greater number of detected abnormalities than the second threshold value and a smaller number of learning times than the prescribed number, the model evaluating unit 134 evaluates that the model is a relearning target. As for a model having a number of learning times reaching the prescribed number and a greater number of detected abnormalities than the second threshold value, the model evaluating unit 134 classifies the device 20 corresponding to the model as the device 20 other than the learning target and evaluates that the device is to be excluded from the learning target. The model evaluating unit 134 registers the identification information on the device 20 evaluated to be excluded from the learning target in the device information storage unit 125.

As for a model evaluated by the model evaluating unit 134 as a model corresponding to the device 20 having a smaller number of learning times than the prescribed number and a greater number of detected abnormalities than the second threshold value, the parameter setting unit 135 sets parameters related to the communication information on the device 20 to be learned by the model. The learning unit 133 has the model relearn according to the parameters set by the parameter setting unit 135. The parameter setting unit 135 sets parameters such as a collection period for communication information and a protocol on the basis of the number of detected abnormalities.

For example, the parameter setting unit 135 sets a learning period for the model according to the number of detected abnormalities about the device 20. Specifically, the parameter setting unit 135 sets a longer learning period as the number of detected abnormalities increases.

[Procedure of Detection Processing]

Figure 2:
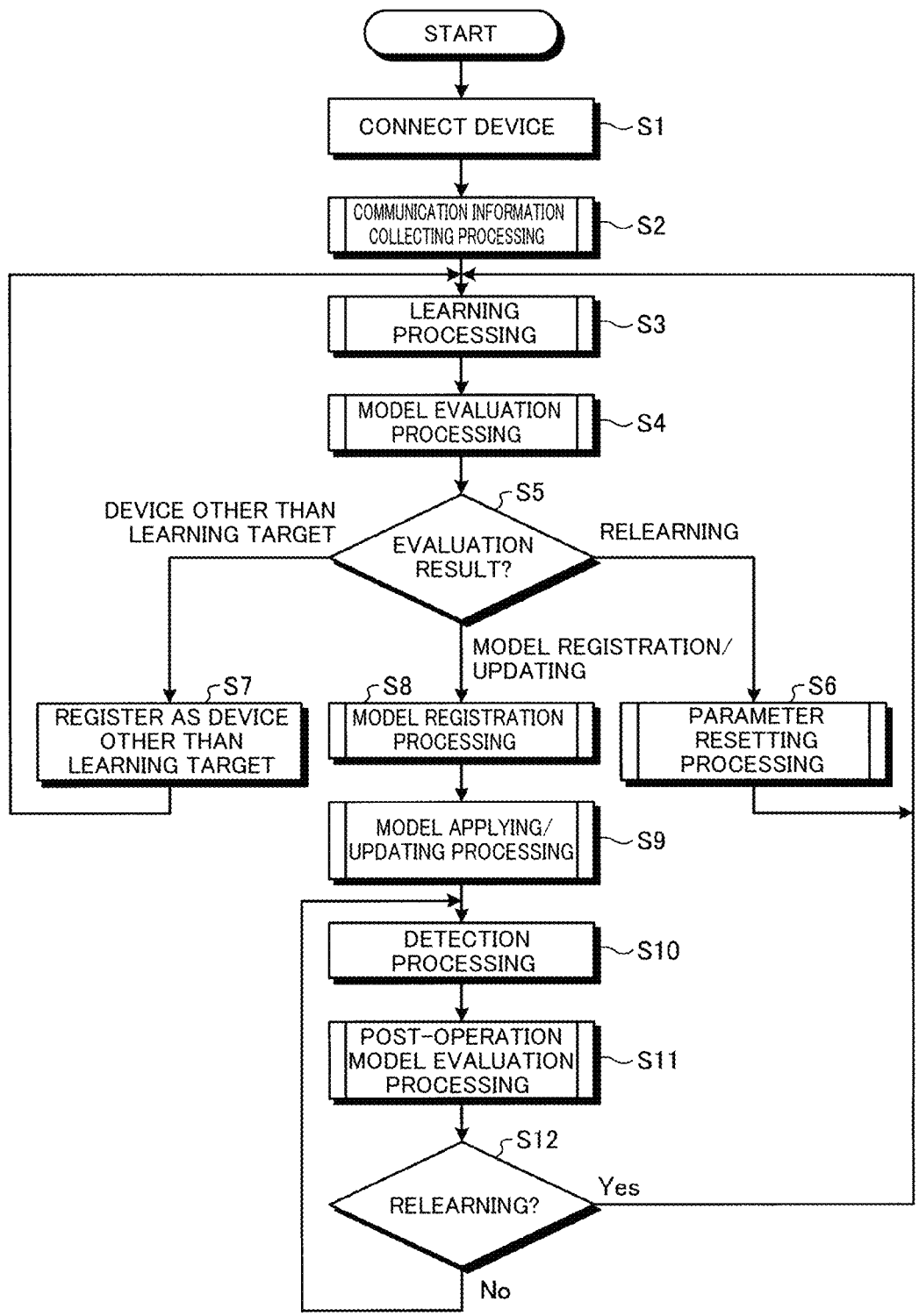
FIG. 2 is a flowchart for illustrating the procedure of detection processing by the detecting device shown in FIG. 1.

The procedure of detection processing by the detecting device 10 will be described. FIG. 2 is a flowchart for illustrating the procedure of detection processing by the detecting device 10 shown in FIG. 1.

As shown in FIG. 2, when devices 20 are connected to the detecting device 10 (step S1), the collecting unit 132 collects communication information on the devices 20 (step S2). Subsequently, the learning unit 133 produces a model by having a model learn characteristics of communication information by a device 20 using communication information about normal communication collected for each of the devices 20 in the learning processing (step S3). The model evaluating unit 134 performs model evaluation processing for evaluating the model produced by the learning unit 133 (step S4).

The control unit 13 determines which the evaluation result in the model evaluation processing indicates among a device other than a learning target, a registerable/updatable model, and a device to be relearned (step S5).

When the evaluation result in the model evaluation processing indicates that the device is not a learning target (device other than a learning target in step S5), the model evaluating unit 134 excludes the device 20 corresponding to the model as a device 20 not to be learned and registers the device 20 as a device other than a learning target in the device information storage unit 125 (step S7). Thereafter, the detecting device 10 proceeds to step S3 and performs learning processing for the next model. Alternatively, the detecting device 10 may return to the communication information collecting processing (step S2).

When the evaluation result in the model evaluation processing indicates relearning (relearning in step S5), the parameter setting unit 135 sets parameters related to the communication information on the device 20 to be learned by the model as parameter resetting processing (step S6). The detecting device 10 then returns to step S3 and the learning unit 133 has the model relearn according to the parameters set by the parameter setting unit 135.

When the evaluation result in the model evaluation processing indicates a registerable/updatable model (model registration/updating in step S5), the model applying unit 131 performs model registration processing (step S8) and model applying/updating processing (step S9).

The model applying unit 131 performs abnormal communication detection processing using the model (step S10). Specifically, the model applying unit 131 inputs communication information by the device 20 as the detection target to the model corresponding to the device 20 and detects whether the communication information on the detection target indicates abnormal communication according to an output result from the model. The model applying unit 131 interrupts the communication when the communication is abnormal communication and permits the communication when the communication is normal communication.

The model applying unit 131 performs post-operation model evaluation processing to evaluate whether the model is to relearn (step S11). The control unit 13 determines whether the evaluation result from the model applying unit 131 indicates relearning (step S12).

When the control unit 13 determines that the evaluation result from the model applying unit 131 indicates relearning (Yes in step S12), the learning unit 133 returns to step S3 and performs relearning by the model. When the control unit 13 determines that the evaluation result from the model applying unit 131 does not indicate relearning (No in step S12), the control returns to step S10 to continue the detection processing using the model by the model applying unit 131.

[Procedure of Communication Information Collecting Processing]

Figure 3:
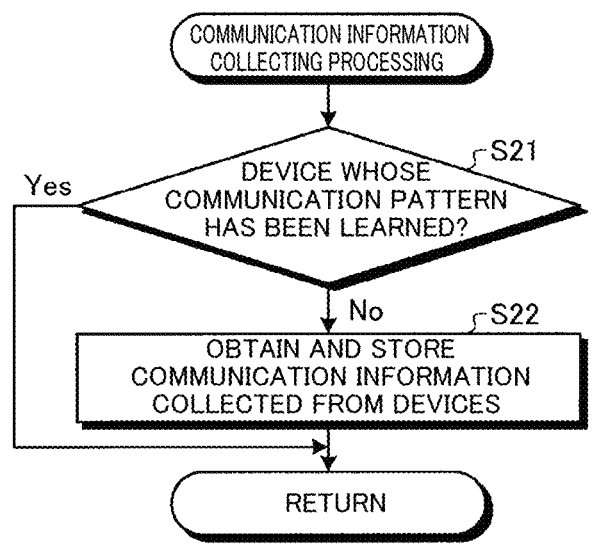
FIG. 3 is a flowchart for illustrating the procedure of communication information collecting processing shown in FIG. 2.

Now, the procedure of communication information collecting processing (step S2) will be described. FIG. 3 is a flowchart for illustrating the procedure of communication information collecting processing shown in FIG. 2.

As shown in FIG. 3, the collecting unit 132 collects communication information and determines whether the device 20 corresponding to the collected communication information is a device 20 about which the communication pattern has been already learned (step S21). Upon determining that the device 20 corresponding to the collected communication information is not a device 20 about which the communication pattern has already been learned (No in step S21), the collecting unit 132 obtains the communication information collected from the device 20 and stores the communication information in the communication information storage unit 121 (step S22).

Upon determining that the device 20 corresponding to the collected communication information is a device 20 about which the communication pattern has been learned (Yes in step S21) or after the end of step S22, the collecting unit 132 ends the communication information collecting processing.

[Procedure of Learning Processing]

Figure 4:
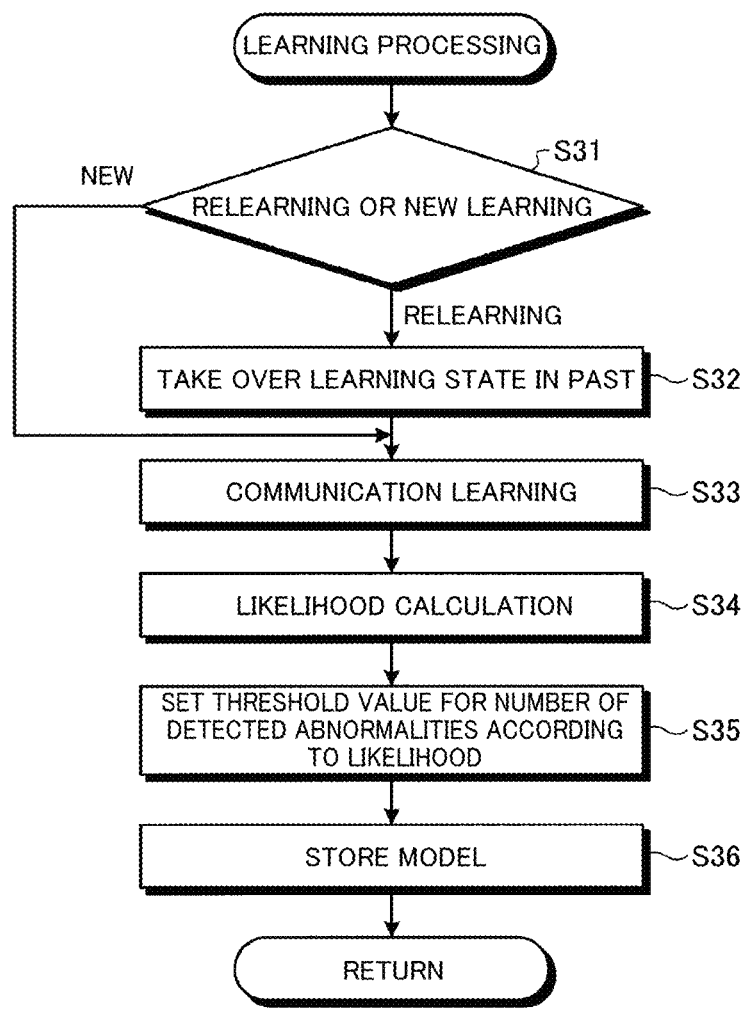
FIG. 4 is a flowchart for illustrating the procedure of learning processing shown in FIG. 2.

The procedure of learning processing (step S3) will be described. FIG. 4 is a flowchart for illustrating the procedure of learning processing shown in FIG. 2.

As shown in FIG. 4, in the learning unit 133, the communication learning unit 1331 determines whether the device 20 corresponding to the communication information collected by the collecting unit 132 is a device to be relearned or newly learned (step S31). Upon determining that the device is to be relearned (relearning in step S31), the communication learning unit 1331 takes over the learning state about the device 20 in the past (step S32).

Upon determining that the device is to be newly learned (new in step S31) or after the end of step S32, the communication learning unit 1331 performs communication learning processing to have the model learn communication information about normal communication by the a learning target (step S33). The model producing unit 1332 produces a model corresponding to the device 20, and the parameters of the model are optimized.

Then, the model producing unit 1332 calculates a likelihood according to the number of learned communication patterns and the number of communication occurrences (step S34). The model producing unit 1332 calculates the likelihood using Expression (1).

$$\text{Likelihood} = 1 - \text{the number of communication patterns/the number of communication occurrences} \quad (1)$$

Subsequently, the model producing unit 1332 sets, for the produced model, a threshold value (the second threshold value) for the number of detected abnormalities according to the calculated likelihood (step S35). For example, when the likelihood is from 0 to 0.6, the model producing unit 1332 sets the second threshold value to 25. When the likelihood is from 0.6 to 0.9, the model producing unit 1332 sets the second threshold value to 40. When the likelihood exceeds 0.9, the model producing unit 1332 sets the second threshold value to 50.

Then, the model producing unit 1332 stores the produced model and the optimized parameters of the model in the model storage unit 122 (step S36).

[Procedure of Model Evaluation Processing]

Figure 5:
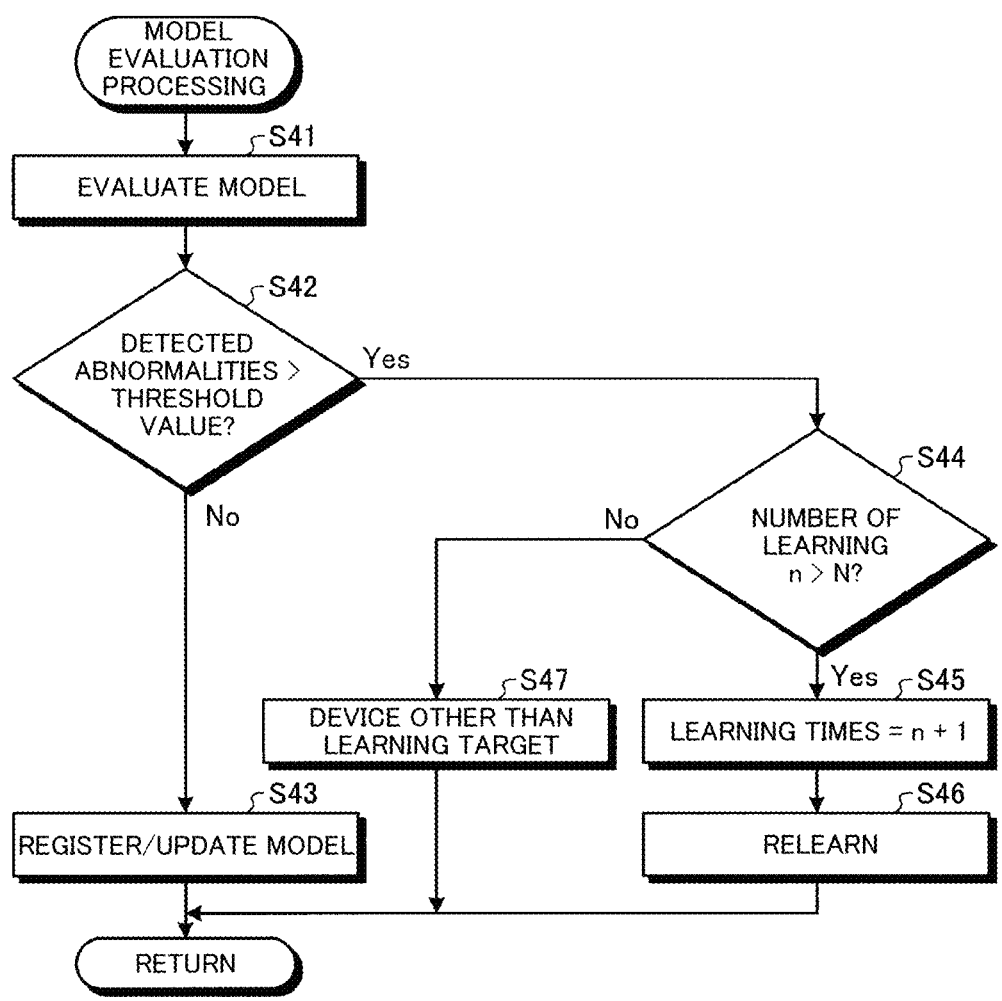
FIG. 5 is a flowchart for illustrating the procedure of model evaluation processing shown in FIG. 2.

Now, the procedure of model evaluation processing (step S4) will be described. FIG. 5 is a flowchart for illustrating the procedure of model evaluation processing shown in FIG. 2.

As shown in FIG. 5, the model evaluating unit 134 evaluates the model produced by the learning unit 133 (step S41). In this case, the model evaluating unit 134 determines whether the number of detected abnormalities exceeds the threshold value (the second threshold value) set for the model (step S42). Here, the detecting device 10 has the model relearn so that the number of detected abnormalities detected by the model which has learned normal communication is not more than a certain number.

Therefore, upon determining that the number of detected abnormalities does not exceed the threshold value (the second threshold value) (No in step S42), the model evaluating unit 134 determines that the learning by the model is sufficient and evaluates that the model can be registered/updated (step S43).

In contrast, upon determining that the number of detected abnormalities exceeds the second threshold value (Yes in step S42), the model evaluating unit 134 determines that the model has not learned sufficiently. The model evaluating unit 134 determines whether the number of learning times n by the model is less than N (step S44). Upon determining that the number of learning times n is less than N (Yes in step S44), the model evaluating unit 134 adds 1 to the number of learning times n (the number of learning times=n+1) (step S45), and evaluates the model as a model to relearn (step S46).

Meanwhile, upon determining that the number of learning times n by the model is not less than N, in other words that the number of learning times n reaches N (No in step S44), the model evaluating unit 134 evaluates the device 20 corresponding to the model as a device 20 other than a learning target (step S47).

[Procedure of Parameter Resetting Processing]

Figure 6:
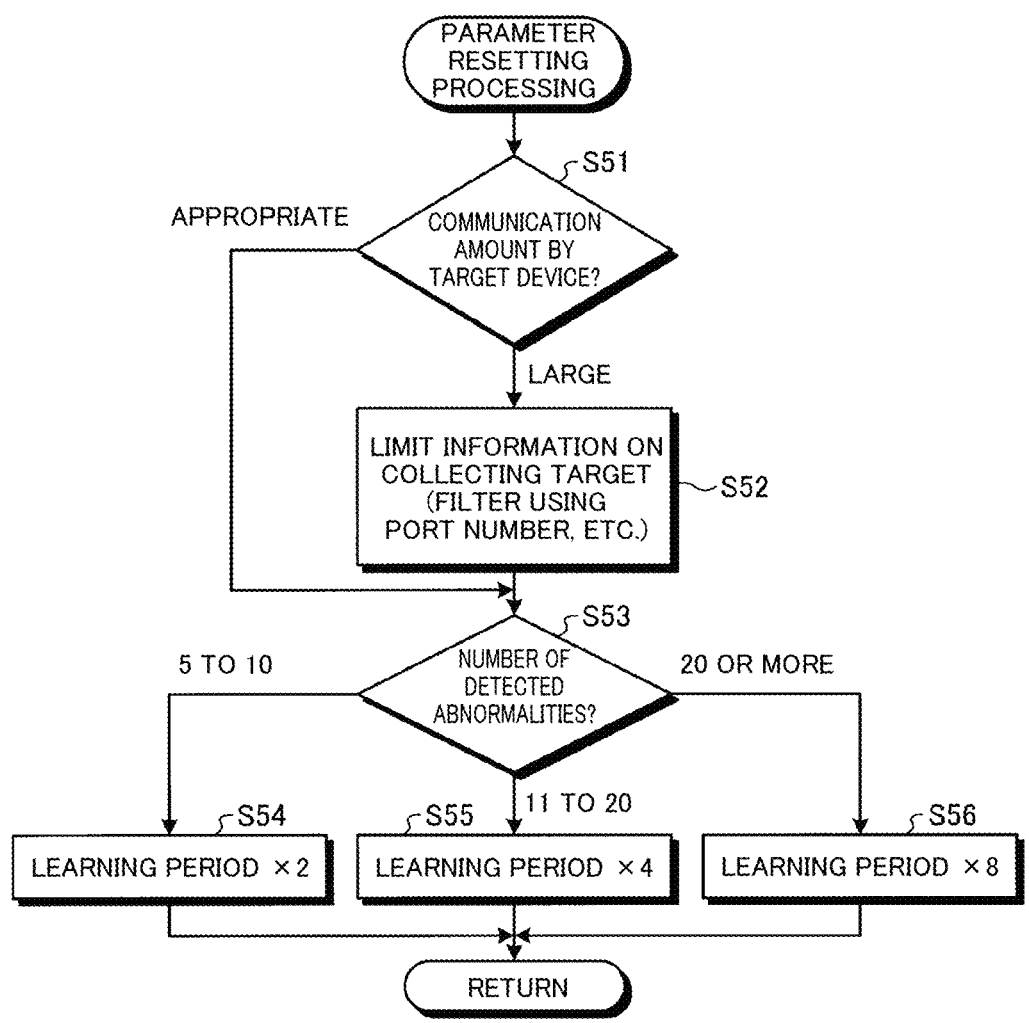
FIG. 6 is a flowchart for illustrating the procedure of parameter resetting processing shown in FIG. 2.

Now, the procedure of parameter resetting processing (step S6) will be described. FIG. 6 is a flowchart for illustrating the procedure of parameter resetting processing shown in FIG. 2.

As shown in FIG. 6, the parameter setting unit 135 determines whether the communication amount by a target device 20 is an appropriate amount or larger than the appropriate amount (step S51). Upon determining that the communication amount by the target device is large (large in step S51), the parameter setting unit 135 limits information to be collected (step S52). For example, the parameter setting unit 135 filters the communication information by the port number, so that the communication to be learned is narrowed down for a device 20 with a large communication amount.

Then, the parameter setting unit 135 determines the number of detected abnormalities upon determining that the communication amount by the target device is an appropriate amount (an appropriate amount in step S51) or after the end of the processing in step S52 (step S53). For example, the parameter setting unit 135 changes the set value for the learning period according to the number of detected abnormalities during a test.

Specifically, upon determining that the number of detected abnormalities is from 5 to 10 (5 to 10 in step S53), the parameter setting unit 135 sets the learning period to a period twice the previous period (step S54). Upon determining that the number of detected abnormalities is from 11 to 20 (11 to 20 in step S53), the parameter setting unit 135 sets the learning period to a period four times the previous period (step S55). Upon determining that the number of detected abnormalities exceeds 20 (20 or more in step S53), the parameter setting unit 135 sets the learning period to a period eight times the previous period (step S56). Note that the relation between the number of detected abnormalities and the learning period shown in FIG. 6 is an example and can be changed depending on the test period of each model and the number of communication occurrences by the device 20. The parameter setting unit 135 may change parameters other than the learning period according to the number of detected abnormalities.

[Procedure of Model Registration Processing]

Figure 7:
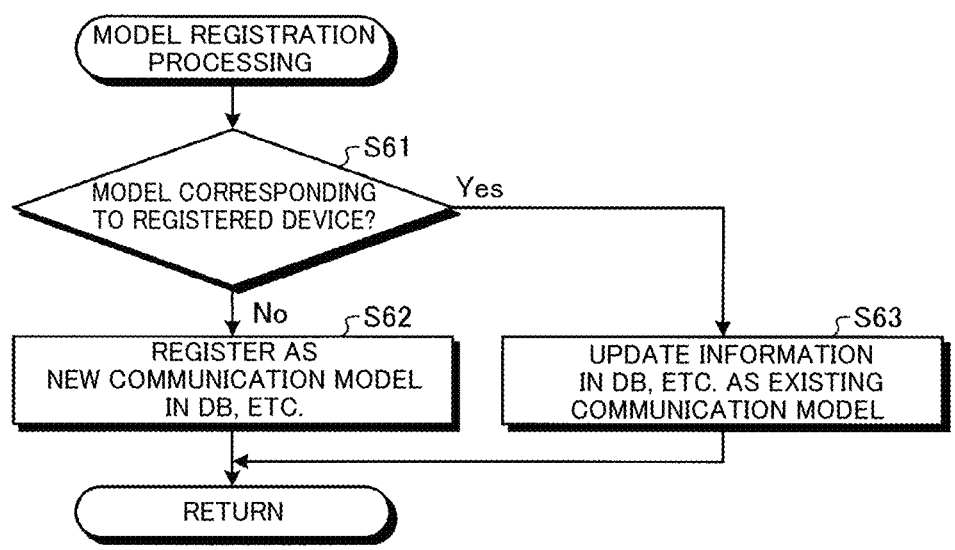
FIG. 7 is a flowchart for illustrating the procedure of model registration processing shown in FIG. 2.

Now, the procedure of model registration processing (step S8) will be described. FIG. 7 is a flowchart for illustrating the procedure of model registration processing shown in FIG. 2.

As shown in FIG. 7, the model applying unit 131 determines whether a model evaluated as a registerable/updatable model is a model corresponding to a registered device (step S61).

Upon determining that the model is not a model corresponding to a registered device (No in step S61), the model applying unit 131 registers the model in a DB or the like (for example in the model storage unit 122) as a new communication model (step S62).

Upon determining that the model is a model corresponding to a registered device (Yes in step S61), the model applying unit 131 updates the model information in a DB or the like (for example in the model storage unit 122) as an existing communication model (step S63). Note that the model may be applied to other equipment (such as a home router) having the same function as the model applying unit 131. Therefore, the detecting device 10 may apply a model evaluated as a registerable and updatable model to another device through the communication unit 11 and the network 30.

[Procedure of Model Applying/Updating Processing]

Figure 8:
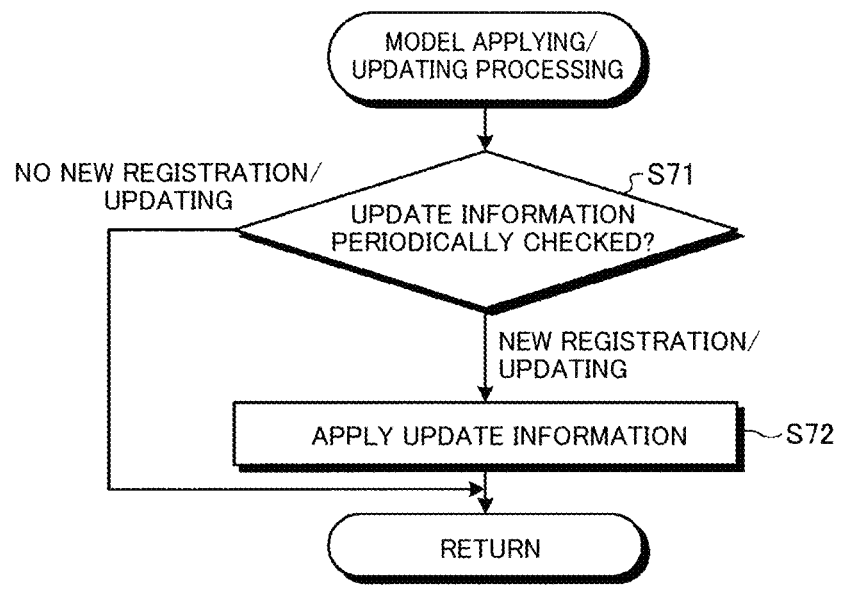
FIG. 8 is a flowchart for illustrating the procedure of model applying/updating processing shown in FIG. 2.

Now, the procedure of model applying/updating processing (step S9) will be described. FIG. 8 is a flowchart for illustrating the procedure of model applying/updating processing shown in FIG. 2.

As shown in FIG. 8, the model applying unit 131 periodically checks update information to determine whether there is new registration/updating (step S71). The model applying unit 131 applies update information upon determining that there is new registration/updating (the presence of registration/updating in step S71) (step S72). The model applying unit 131 ends the model applying/updating processing upon determining that there is no new registration/updating (no new registration/updating in step S71) or after the end of the processing in step S72.

[Procedure of Post-Operation Model Evaluation Processing]

Figure 9:
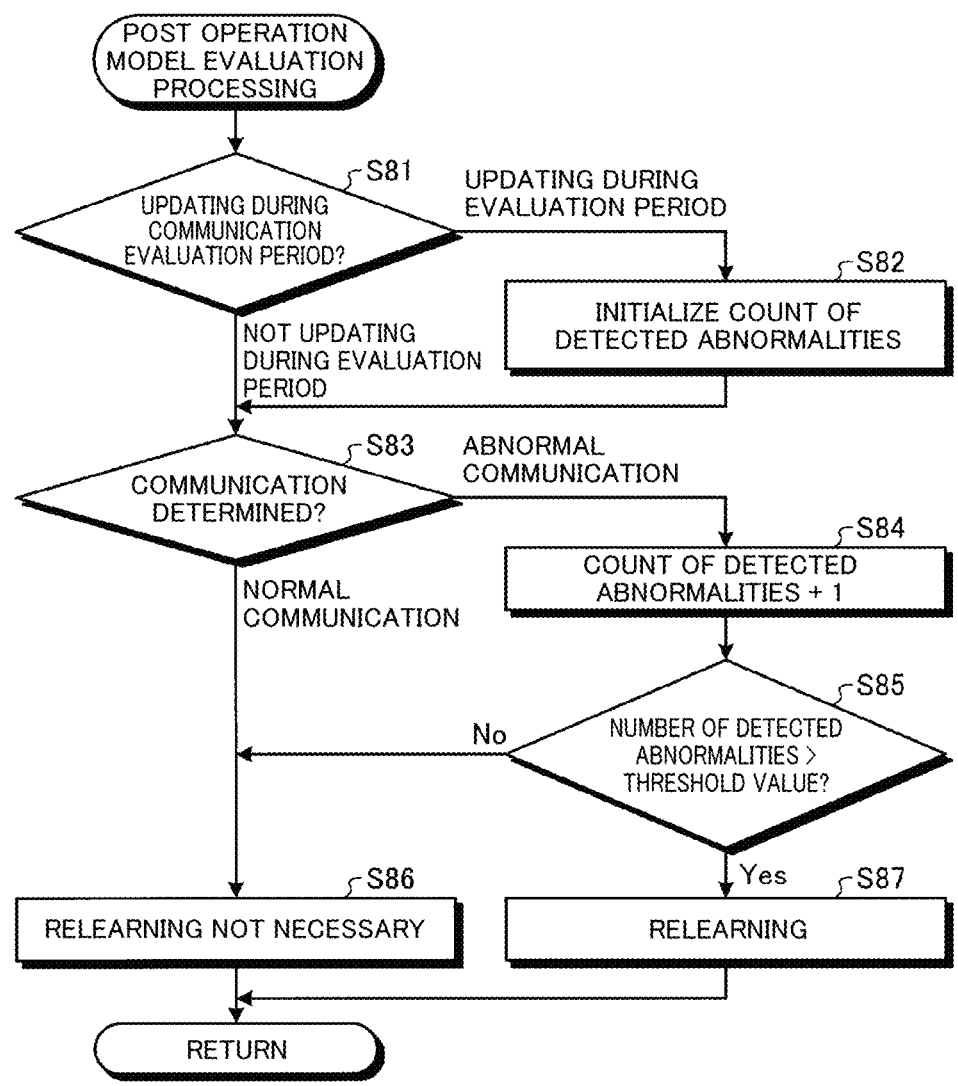
FIG. 9 is a flowchart for illustrating the procedure of post-operation model evaluation processing shown in FIG. 2.

Now, the procedure of post-operation model evaluation processing (step S11) will be described. FIG. 9 is a flowchart for illustrating the procedure of post-operation model evaluation processing shown in FIG. 2.

As shown in FIG. 9, the model applying unit 131 determines whether it is time to update the communication evaluation period for a model for evaluation (step S81). The communication evaluation period is set for example to one month by the detecting device 10. Upon determining that it is time to update the communication evaluation period (updating of the evaluation period in step S81), the model applying unit 131 initializes the count of the number of detected abnormalities (step S82). In other words, when the set communication evaluation period is exceeded, the model applying unit 131 initializes the count of the number of detected abnormalities.

Then, upon determining that it is not time to update the commutation evaluation period (not the updating time for the evaluation period in step S81) or after the end of the processing in step S82, the model applying unit 131 determines whether the communication is normal communication or abnormal communication (step S83).

Upon determining that the communication is abnormal communication (abnormal communication in step S83), the model applying unit 131 adds 1 to the count of the number of detected abnormalities (step S84). The model applying unit 131 determines whether the number of abnormal communication occurrences exceeds a threshold value (the first threshold value) (step S85).

Upon determining that the number of abnormal communication occurrences does not exceed the first threshold value (No in step S85) or that the communication is normal communication (normal communication in step S83), the model applying unit 131 evaluates that the model does not need relearning (step S86).

Upon determining that the number of abnormal communication occurrences exceeds the first threshold value (Yes in step S85), the model applying unit 131 evaluates that the model needs relearning (step S87). In this way, the model applying unit 131 evaluates a model during the operation of the model, and when the number of abnormal communication occurrences exceeds the first threshold value in the detection processing using the model, the learning unit 133 has the model relearn.

Effects of Embodiments

In this way, the detecting device 10 according to the embodiment has the model learn characteristics of communication information by a device 20 using the communication information collected for each of the devices 20. The detecting device 10 inputs communication information on a detection target to the model and detects whether the communication information on the detection target indicates abnormal communication on the basis of an output result from the model. At the same time, the detecting device 10 has the model relearn when the number of detected abnormalities about the communication information exceeds a prescribed threshold value during a determined evaluation period.

Therefore, the detecting device 10 according to the embodiment periodically evaluates a model and has the model relearn according to an evaluation result during the operation of the model, so that the model for detecting an abnormality about the communication information can have improved accuracy. In addition, the detecting device 10 itself determines whether to perform relearning according to the operation state. Stated differently, the detecting device 10 determines whether to perform relearning or continue operation in response to erroneous detection after the start of operation on the side of the detecting device 10. Therefore, the detecting device 10 eliminates the necessity for determination by the system operator, which can reduce the operating load on the system operator.

Then, the detecting device 10 evaluates the model after learning on the basis of the number of detected abnormalities and the number of learning times about the communication information. As for a model corresponding to a device 20 evaluated to have a smaller number of learning times than a prescribed number and a greater number of detected abnormalities than a prescribed threshold value, the detecting device 10 sets parameters related to the communication information on the device 20 to be learned by the model. The detecting device 10 has the model learn again according to the set parameters.

Therefore, the detecting device 10 evaluates a model after producing the model and determines a model for each of the devices 20 while repeatedly having the model learn so that the number of detected abnormalities is less than the prescribed threshold value. Therefore, the detecting device 10 can improve the accuracy of the model for detecting an abnormality about communication information.

The detecting device 10 sets a learning period for a model corresponding to a device 20 evaluated to have a smaller number of learning times than a prescribed number and a greater number of detected abnormalities than a prescribed number, and the period is set according to the number of detected abnormalities about the device 20.

Therefore, the detecting device 10 itself can perform relearning while adjusting parameters such as the period of communication information to be learned. Therefore, the detecting device 10 can optimize the period for learning a communication pattern. For example, the detecting device 10 can perform learning in a short period at the time of the first learning in learning normal communication and adjust the learning period according to the number of detected abnormalities for each of the devices when relearning is required, in other words, the device can flexibly set the learning period for each occasion of learning.

The detecting device 10 classifies, as a device 20 other than a learning target, a device 20 evaluated to have a greater number of detected abnormalities than a certain number and a number of learning times reaching a prescribed number and excludes the device as a device not to be learned, so that excessive learning can be avoided.

The detecting device 10 sets a prescribed threshold value according to a likelihood calculated according to the number of communication patterns and the number of communication occurrences during learning by a model. Specifically, in the detecting device 10, when the calculated likelihood is lower than a prescribed value, the prescribed threshold value is set to a lower value than a prescribed value. More specifically, the detecting device 10 allows relearning to be performed more easily by setting a lower threshold value for a lower likelihood, so that a certain degree of accuracy can be kept for any of models.

In this way, the detecting device 10 according to the embodiment allows the accuracy of the model for detecting an abnormality about communication information to be improved, and the operation load on the system operator to be reduced.

[System Configuration, Etc.]

The components of each of the illustrated devices represent functional concepts and do not have to be physically configured as illustrated. In other words, the specific forms of distribution and integration of the devices are not limited to the shown examples and can be, in whole or part, functionally or physically distributed and integrated in arbitrary units depending on various loads, use conditions, and the like. Furthermore, the processing functions performed in the devices, in whole or part, may be implemented by a CPU and a program to be analyzed and executed in the CPU or may be implemented as hardware by wired logic.

In the description of the embodiment, among the various kinds of processing, those automatically performed, in whole or part, may also be performed manually or those performed manually, in whole or part, may be performed automatically in a known manner. In addition, information including processing procedures, control procedures, specific names, various kinds of data, and parameters described and shown in the description and drawings may be optionally changed unless otherwise specified.

[Program]

Figure 10:
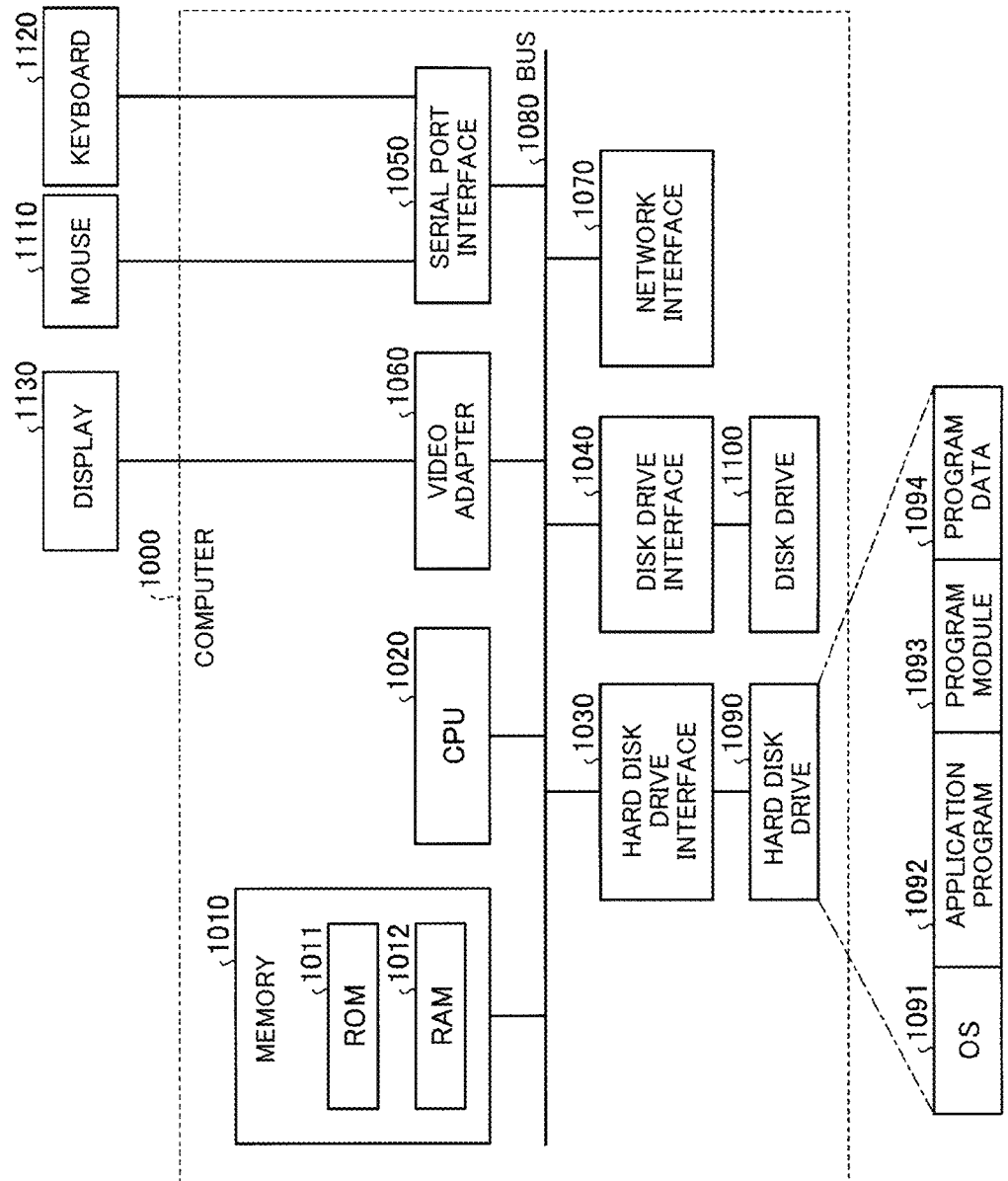
FIG. 10 is a diagram showing an example of a computer in which a detecting device is implemented by executing a program.

FIG. 10 is a diagram for illustrating an example of a computer in which the detecting device 10 is implemented by executing a program. For example, the computer 1000 includes a memory 1010 and a CPU 1020. The computer 1000 also includes a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores a boot program such as a BIOS (Basic Input Output System). The hard disk drive interface 1030 is connected to a hard disk drive 1090. The disk drive interface 1040 is connected to a disk drive 1100. A removable storage medium such as a magnetic disk and an optical disk is inserted into the disk drive 1100. The serial port interface 1050 is for example connected to a mouse device 1110 and a keyboard 1120. The video adapter 1060 is for example connected to a display 1130.

The hard disk drive 1090 stores for example an OS (Operating System) 1091, an application program 1092, a program module 1093, and program data 1094. More specifically, the program defining each kind of processing by the detecting device 10 is implemented as the program module 1093 in which a code executable by the computer is described. The program module 1093 is stored for example in the hard disk drive 1090. For example, the program module 1093 for executing processing identical to the functional configuration of the detecting device 10 is stored in the hard disk drive 1090. The hard disk drive 1090 may be replaced by an SSD.

Then, the setting data used in the processing according to the above-described embodiment is stored as the program data 1094 for example in the memory 1010 or the hard disk drive 1090. The CPU 1020 then reads out the program module 1093 or the program data 1094 stored in the memory 1010 or the hard disk drive 1090 into the RAM 1012 for execution as needed.

Note that the program module 1093 and the program data 1094 may be stored in a removable storage medium and read out by the CPU 1020 for example through the disk drive 1100 rather than being stored in the hard disk drive 1090. Alternatively, the program module 1093 and the program data 1094 may be stored in another computer connected over a network (such as LAN and WAN (Wide Area Network)).

The program module 1093 and the program data 1094 may then be read out from the computer by the CPU 1020 through the network interface 1070.

As in the foregoing, although the embodiment to which the invention made by the inventor is applied has been described, the present invention is not limited by the description and the drawings which form part of the disclosure of the present invention according to the embodiment. More specifically, other embodiments, examples, operation techniques, and the like made by a person skilled in the art on the basis of the embodiment all fall within the scope of the present invention.

REFERENCE SIGNS LIST

1 Detecting system
10 Detecting device
11 Communication unit
12 Storage unit
13 Control unit
20, 20-1 to 20-m Device
30 Network
121 Communication information storage unit
122 Model storage unit
123 Parameter information storage unit
124 Threshold value information storage unit
125 Device information storage unit
131 Model applying unit
132 Collecting unit
133 Learning unit
134 Model evaluating unit
135 Parameter setting unit
1331 Communication learning unit
1332 Model producing unit

The invention claimed is:

1. A detecting devices, comprising:
a memory; and
processing circuitry coupled to the memory and configured to:
collect communication information from a communication device;
have a model learn a characteristic of the communication information by the communication device using the communication information collected for each of the communication devices;
input communication information on a detection target to the model;
detect whether the communication information on the detection target indicates abnormal communication based on an output result from the model;
have the model relearn the characteristic when a number of detected abnormalities about the communication information during a predetermined evaluation period exceeds a first threshold value;
evaluate the model after learning based on the number of detected abnormalities and a number of learning times;
set a parameter for a model corresponding to a communication device evaluated to have a smaller number of learning times than a prescribed number and a greater number of detected abnormalities than a second threshold value, the parameter being related to communication information on the communication device to be learned by the model;
have the model relearn according to the set parameter; and
classify, as a communication device other than a learning target, the communication device evaluated to have a number of learning times reaching the prescribed number and a greater number of detected abnormalities than the second threshold value and exclude the communication device from the learning target.

2. The detecting device according to claim 1, wherein the processing circuitry is further configured to set a learning period for the model corresponding to the communication device evaluated to have a smaller number of learning times than the prescribed number and a greater number of detected abnormalities than the second threshold value, the learning period being set according to the number of detected abnormalities about the communication device.

3. The detecting device according to claim 1, wherein the processing circuitry is further configured to set the second threshold value according to a likelihood calculated according to the number of communication patterns and the number of communication occurrences during learning by the model.

4. The detecting device according to claim 3, wherein the processing circuitry is further configured to set the second threshold value to be lower than a prescribed value when the calculated likelihood is lower than a prescribed value.

5. A method for detecting by a detecting device, the method comprising:
collecting communication information from a communication device;
having a model learn a characteristic of communication information by the communication device using the communication information collected for each of the communication devices;
inputting communication information on a detection target to the model;
detecting whether the communication information on the detection target indicates abnormal communication based on an output result from the model;
performing relearning by the model when a number of detected abnormalities about the communication information during a determined evaluation period exceeds a first threshold value;
evaluating the model after learning based on the number of detected abnormalities and a number of learning times;
setting a parameter for a model corresponding to a communication device evaluated to have a smaller number of learning times than a prescribed number and a greater number of detected abnormalities than a second threshold value, the parameter being related to communication information on the communication device to be learned by the model;
performing the relearning by the model according to the set parameter; and
classifying, as a communication device other than a learning target, the communication device evaluated to have a number of learning times reaching the prescribed number and a greater number of detected abnormalities than the second threshold value and exclude the communication device from the learning target.

6. A detecting device, comprising:
a memory; and
processing circuitry coupled to the memory and configured to:
collect communication information from a communication device;

have a model learn a characteristic of the communication information by the communication device using the communication information collected for each of the communication devices;

input communication information on a detection target to the model;

detect whether the communication information on the detection target indicates abnormal communication based on an output result from the model;

have the model relearn the characteristic when a number of detected abnormalities about the communication information during a predetermined evaluation period exceeds a first threshold value;

evaluate the model after learning based on the number of detected abnormalities and a number of learning times;

set a parameter for a model corresponding to a communication device evaluated to have a smaller number of learning times than a prescribed number and a greater number of detected abnormalities than a second threshold value, the parameter being related to communication information on the communication device to be learned by the model;

have the model relearn according to the set parameter; and set the second threshold value according to a likelihood calculated according to the number of communication patterns and the number of communication occurrences during learning by the model.

* * * * *